US012723144B2

(12) United States Patent
Xu et al.

(10) Patent No.: US 12,723,144 B2
(45) Date of Patent: Sep. 1, 2026

(54) PREPARATION METHOD FOR Ag AND g-C3N4 CO-MODIFIED ZnO NANOCOMPOSITE MATERIAL USING POLYMER NETWORK GEL METHOD

(71) Applicant: Southwest Minzu University, Chengdu (CN)

(72) Inventors: Ming Xu, Chengdu (CN); Han Li, Chengdu (CN); Qiuping Zhang, Chengdu (CN); Huan Yuan, Chengdu (CN); Fei Yu, Chengdu (CN); Man Song, Chengdu (CN)

(73) Assignee: Southwest Minzu University, Chengdu (CN)

( * ) Notice: Subject to any disclaimer, the term of this patent is extended or adjusted under 35 U.S.C. 154(b) by 453 days.

(21) Appl. No.: 18/462,507

(22) Filed: Sep. 7, 2023

(65) Prior Publication Data

US 2024/0117147 A1 Apr. 11, 2024

(30) Foreign Application Priority Data

Oct. 9, 2022 (CN) ......................... 202211226150.5

(51) Int. Cl.

| | |
|---|---|
| ***C08K 3/08*** | (2006.01) |
| ***B01J 23/06*** | (2006.01) |
| ***B01J 23/50*** | (2006.01) |
| ***B01J 27/24*** | (2006.01) |
| ***B01J 35/39*** | (2024.01) |
| ***C08K 3/22*** | (2006.01) |
| ***C08K 3/28*** | (2006.01) |

(52) U.S. Cl.

CPC ................. *C08K 3/08* (2013.01); *B01J 23/06* (2013.01); *B01J 23/50* (2013.01); *B01J 27/24* (2013.01); *B01J 35/39* (2024.01); *C08K 3/22* (2013.01); *C08K 3/28* (2013.01); *C08K 2003/0806* (2013.01); *C08K 2003/2296* (2013.01); *C08K 2201/011* (2013.01)

(58) Field of Classification Search

CPC ... B01J 35/39; B01J 23/06; B01J 23/50; B01J 27/24; C08K 3/08; C08K 3/22; C08K 3/28; C08K 2003/0806; C08K 2003/2296; C08K 2201/011; C01B 21/0605

USPC ......................................... 502/343, 344, 347

See application file for complete search history.

(56) References Cited

FOREIGN PATENT DOCUMENTS

| | | | | |
|---|---|---|---|---|
| CN | 110813358 A | * | 2/2020 | ............ B01J 23/002 |
| CN | 112759253 A | * | 5/2021 | ............. A01N 59/16 |
| CN | 113083302 A | * | 7/2021 | ............ B01J 23/688 |

OTHER PUBLICATIONS

Suyana Panneri et al., “Copyrolysed C3N4-Ag/ZnO Ternary Heterostructure Systems for Enhanced Adsorption and Photocatalytic Degradation of Tetracycline.” European Journal of Inorganic Chemistry, pp. 5068-5076. (Year: 2016).*

Shuanglong Ma et al., “Enhanced photocatalytic bactericidal performance and mechanism with novel Ag/ZnO/g-C3N4 composite under visible light.” Catalysis Today 330, pp. 179-188. (Year: 2019).*

Han Li, et al., “Facile synthesis of ZnO/Ag/g-C3N4 nanocomposites for multiple applications in photocatalytic degradation and photoactivated NO2 sensing.” Applied Surface Science 638, pp. 1-12. (Year: 2023).*

Zijie Zhang et al., “Synthesis and properties of Ag/ZnO/g-C3N4 ternary micro/nanocomposites by microwave-assisted method.” Materials Research Express 5, pp. 1-10. (Year: 2018).*

Nguyen Quoc Thang, et al., “High-efficient photocatalytic degradation of commercial drugs for pharmaceutical wastewater treatment prospects: A case study of Ag/g-C3N4/ZnO nanocomposite materials.” Chemosphere 282, pp. 1-12. (Year: 2021).*

Y. Liu et al., “Comparative study of photocatalysis and gas sensing of ZnO/Ag nanocomposites synthesized by one- and two-step polymer-network gel processes.” Journal of Alloys and Compounds 868, pp. 1-13. (Year: 2021).*

* cited by examiner

*Primary Examiner* — Patricia L. Hailey

(74) *Attorney, Agent, or Firm* — Hemisphere Law, PLLC

(57) ABSTRACT

A preparation method for a silver (Ag) and graphitic carbon nitride (g-$C_3N_4$) co-modified zinc oxide (ZnO) nanocomposite material using a polymer network gel method includes: dispersing zinc oxide, bulk graphitic carbon nitride, and a soluble silver salt in water to obtain a first solution; adding glucose, a complexing agent, a polymer monomer, and a cross-linking agent into the first solution to obtain a second solution; performing a heating reaction on the second solution to obtain a three-dimensional network wet gel; drying the three-dimensional network wet gel to obtain a dry gel, and calcining the dry gel to obtain the Ag and g-$C_3N_4$ co-modified ZnO nanocomposite material. The preparation method has advantages of low cost, short period and simple steps; and the prepared nanocomposite material can be simultaneously applied to photocatalytic degradation of organic dye pollutants and photoexcitation detection of nitrogen dioxide gas at room temperature.

6 Claims, 14 Drawing Sheets

PREPARATION METHOD FOR Ag AND g-C3N4 CO-MODIFIED ZnO NANOCOMPOSITE MATERIAL USING POLYMER NETWORK GEL METHOD

TECHNICAL FIELD

The disclosure relates to the field of environmental protection technologies and particularly to a preparation method for a sliver (Ag) and graphitic carbon nitride ($g$-$C_3N_4$) co-modified zinc oxide (ZnO) nanocomposite material using a polymer network gel method, which is applied to efficient photocatalytic degradation of organic dye pollutants and detection of nitrogen dioxide ($NO_2$) gas.

BACKGROUND

The design and preparation of photocatalytic or gas sensing materials with reasonable price, high charge separation efficiency, excellent performance and good stability are a research hotspot in the field of environmental protection. At present, the research of new photocatalysts or photoassisted gas sensing materials focuses on multi-phase composite materials, and a combination of metal oxide semiconductors, carbon nanomaterials and noble metal nanoparticles has been proved to be an efficient and feasible scheme. A preparation process of a ternary nanocomposite material with high-activity including a carbon-based material, a noble metal and a metal oxide includes: firstly synthesizing a metal oxide-based binary heterojunction system (i.e., a composite material made of the metal oxide and the carbon-based material or a composite material made of the metal oxide and the noble metal), then introducing a last component to prepare the ternary nanocomposite material. The prepared ternary nanocomposite material is only applied to one functional test of pollutant degradation, water photolysis hydrogen evolution, carbon dioxide reduction and gaseous pollution detection. Generally speaking, most of the reported preparation methods of carbon-based material/noble metal/metal oxide ternary composite nanomaterials have some shortcomings, such as a long cycle, complicated operation steps, expensive raw materials and a single application direction, and thus the feasibility of actual production remains to be solved.

SUMMARY

To solve the above problems, the disclosure provides a preparation method for an Ag and $g$-$C_3N_4$ co-modified ZnO nanocomposite material using a polymer network gel method and a product and an application thereof. The preparation method of the disclosure has advantages of low cost, short period and simple steps; and the prepared Ag and $g$-$C_3N_4$ co-modified ZnO ternary nanocomposite material (i.e., the Ag and $g$-$C_3N_4$ co-modified ZnO nanocomposite material) can be simultaneously applied to efficient photocatalytic degradation of organic dye pollutants and photoexcitation detection of nitrogen dioxide gas at room temperature, and is a high-activity ternary nanocomposite material.

To achieve the above purpose, the disclosure provides following technical schemes.

A first technical scheme of the disclosure is to provide a preparation method for an Ag and $g$-$C_3N_4$ co-modified ZnO nanocomposite material using a polymer network gel method, and the preparation method includes:

dispersing zinc oxide, bulk graphitic carbon nitride, and a soluble silver salt in water to obtain a first solution; adding glucose, a complexing agent, a polymer monomer, and a cross-linking agent into the first solution to obtain a second solution; performing a heating reaction on the second solution to obtain a three-dimensional network wet gel; drying the three-dimensional network wet gel to obtain a dry gel, and calcining the dry gel to obtain the Ag and $g$-$C_3N_4$ co-modified ZnO nanocomposite material.

The added glucose of the disclosure can prevent the gel (i.e., three-dimensional network wet gel) from collapsing during the drying process. The bulk $g$-$C_3N_4$ prepared by a thermal condensation method has a two-dimensional layered structure formed by stacking multilayer nanosheets, so that the bulk $g$-$C_3N_4$ has high surface inertness, slow reaction kinetics, low charge carrier mobility and fast charge recombination. For hydrogen bonds of a polymerization melon unit layer in the bulk $g$-$C_3N_4$, especially, the short hydrogen bond is not stable enough for an oxidation process in the air, and the bulk $g$-$C_3N_4$ will be gradually oxidized and peeled off under high temperature calcination. A thickness of the bulk $g$-$C_3N_4$ is reduced to obtain a required thin nanosheet (also referred to as a thin $g$-$C_3N_4$ nanosheet) by thermal oxidation etching, a specific surface area of the thin nanosheet is significantly increased, the thin nanosheet can expose more active sites, and charge carriers can be rapidly transferred to a surface of the thin nanosheet to participate in a reaction. The calcining step in the disclosure can decompose the soluble silver salt into the Ag single substance at a high temperature to obtain a ZnO based ternary nanocomposite material (also referred to as the Ag and $g$-$C_3N_4$ co-modified ZnO nanocomposite material) co-modified by Ag nanoparticles and the $g$-$C_3N_4$ nanosheet.

In an embodiment, a mass ratio between the zinc oxide and the bulk graphitic carbon nitride is 1:1, and a molar ratio between silver ions in the soluble silver salt and the zinc oxide is 3:100.

In an embodiment, the complexing agent is tartaric acid, the polymer monomer is acrylamide, and the cross-linking agent is N, N'-methylene bisacrylamide.

In an embodiment, a molar ratio between the glucose and silver ions in the soluble silver salt is 110:1, a molar ratio between the complexing agent and the silver ions in the soluble silver salt is 1.5:1, a molar ratio between the polymer monomer and the silver ions in the soluble silver salt is 7.5:1, and a molar ratio between the cross-linking agent and the silver ions in the soluble silver salt is 1.5:1.

In an embodiment, a temperature of the heating reaction is 90 Celsius degrees (° C.), and a duration of the heating reaction is 2 hours.

In an embodiment, a temperature of calcining the dry gel is 550° C., and a duration of calcining the dry gel is 3 hours.

A second technical scheme of the disclosure is to provide the Ag and $g$-$C_3N_4$ co-modified ZnO nanocomposite material prepared by the preparation method for the Ag and $g$-$C_3N_4$ co-modified ZnO nanocomposite material using the polymer network gel method.

A third technical scheme of the disclosure is to provide an application method of the Ag and $g$-$C_3N_4$ co-modified ZnO nanocomposite material in photocatalytic degradation of organic pollutants. The application method includes: adding the Ag and g-C3N4 co-modified ZnO nanocomposite material into the organic pollutant; and degrading the organic pollutant under catalysis of the Ag and g-C3N4 co-modified ZnO nanocomposite material and light irradiation A fourth technical scheme of the disclosure is to provide an application method of the Ag and g-$C_3N_4$ co-modified ZnO nanocomposite material in photoexcitation detection of nitrogen dioxide gas. The application method includes:

- cleaning a silicon substrate with interdigital electrodes, then drying the silicon substrate to obtain a dried silicon substrate;
- spraying an ethanol suspension containing the Ag and g-C3N4 co-modified ZnO nanocomposite material onto the dried silicon substrate;
- drying the dried silicon substrate sprayed the ethanol suspension to obtain a photoexcited $NO_2$ gas sensor; and using the photoexcited $NO_2$ gas sensor to detect the $NO_2$ gas.

Beneficial technical effects of the disclosure are as follows.

The preparation method for the Ag and g-$C_3N_4$ co-modified ZnO nanocomposite material using the polymer network gel method provided by the disclosure has advantages of easy operation, short period, and low cost, and can prepare a high-activity ternary nanocomposite material which can be simultaneously applied to photocatalytic degradation of organic dye pollutants and light excitation detection of nitrogen dioxide gas at room temperature.

BRIEF DESCRIPTION OF DRAWINGS

FIG. 1A illustrates a schematic view of photocatalytic degradation rate curves of the five samples. FIG. 1B illustrates a schematic view of pseudo-first-order kinetic constants of the five samples. FIG. 1C illustrates a schematic view of cyclic degradation rates of Rhodamine B (RhB) dye solutions by ZnO and ZACN under simulated sunlight irradiation (120 $\mu W \cdot cm^{-2}$). FIG. 1D illustrates a schematic view of degradation rates of RhB dye solutions by ZACN and AZ under natural sunlight irradiation (65 $\mu W \cdot cm^{-2}$).

FIG. 2A illustrates a schematic view of dynamic resistance curves of the sensors based on different materials to $NO_2$ gas with a concentration in a range of 1-5 parts per million (ppm) under warm white light excitation. FIG. 2B illustrates a schematic view of dynamic response curves of the sensors based on different materials to $NO_2$ gas with a concentration in the range of 1-5 ppm under warm white light excitation. FIG. 2C illustrates a schematic view of response and recovery time of ZACN to $NO_2$ gas with different concentrations. FIG. 2D illustrates a schematic view of an evaluation result of gas sensing performance of the sensor based on ZACN to $NO_2$ gas with a concentration of 5 ppm under warm white light excitation for 6 months.

FIG. 3A illustrates a high-resolution transmission electron microscope (TEM) image of ZACN. FIG. 3B illustrates a structural schematic diagram of ZACN (1 represents a ZnO conduction band, 2 represents a ZnO valence band, 3 represents a g-$C_3N_4$ conduction band, 4 represents a g-$C_3N_4$ valence band, and 5 represents an Ag nanoparticle). FIG. 3C illustrates a schematic diagram of nitrogen adsorption-desorption isotherms of five materials (i.e., the five samples). FIG. 3D illustrates a photoluminescence spectrum of the five materials. FIG. 3E illustrates a diffuse reflection absorption spectrum of ultraviolet-visible light of the five materials.

DETAILED DESCRIPTION OF EMBODIMENTS

Figure 1A:
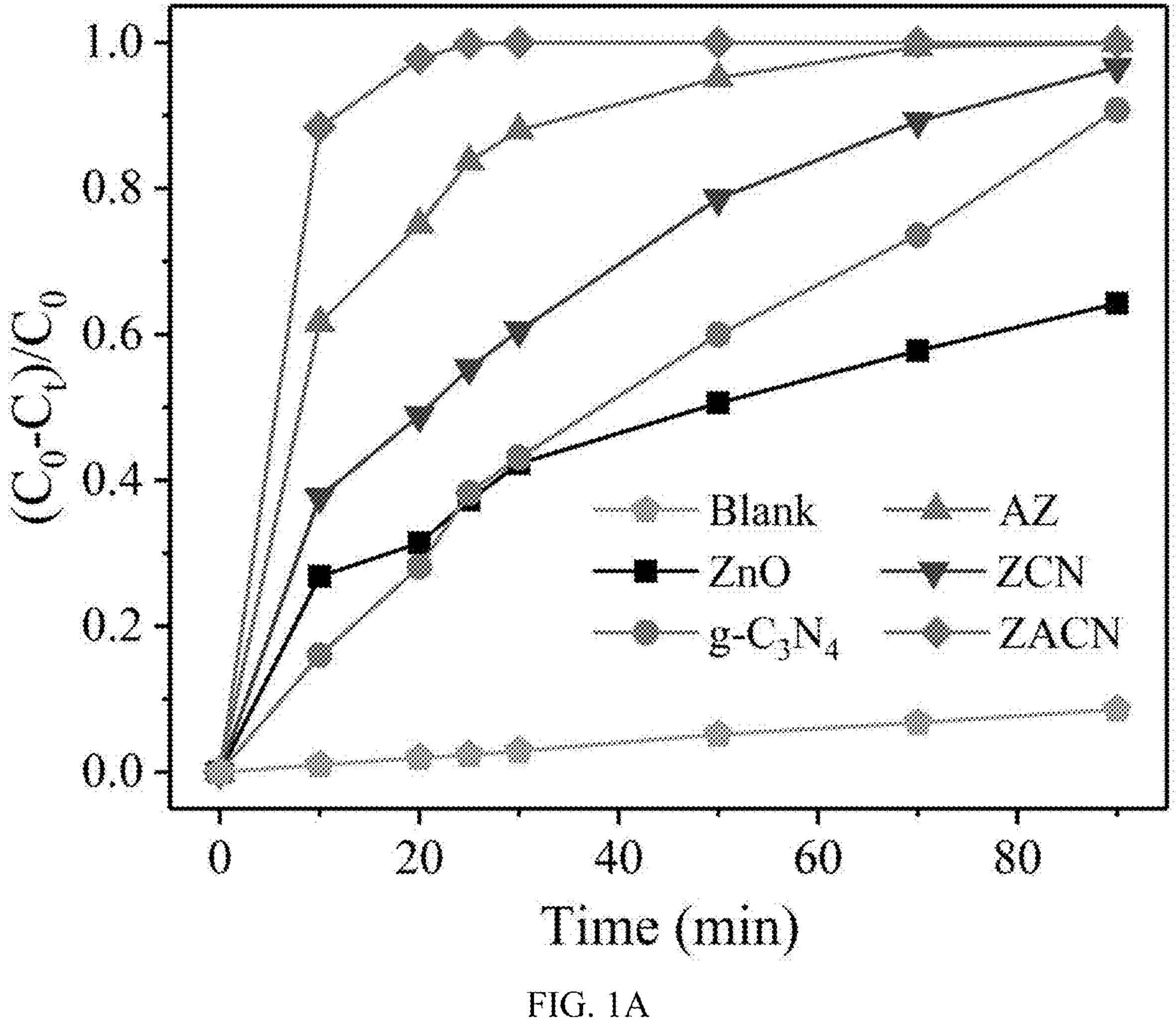
FIGS. 1A-1D illustrate schematic views for evaluation of photocatalytic activities of five samples including an Ag and g-$C_3N_4$ co-modified ZnO nanocomposite material recorded as ZACN prepared in an embodiment 1, an Ag modified ZnO based nanomaterial recorded as AZ prepared in a comparative example 1, a g-$C_3N_4$ modified ZnO-based nanomaterial record as ZCN prepared in a comparative example 2, ZnO, and g-$C_3N_4$. Specifically.

Various exemplary embodiments of the disclosure will now be described in detail. This detailed description should not be taken to a limitation of the disclosure, but rather should be taken as a more detailed description of certain aspects, features, and embodiments of the disclosure. It is to be understood that the terminology used herein is for a purpose of describing particular embodiments only and is not intended to be a limitation of the disclosure.

In addition, with respect to numerical ranges in the disclosure, it should be understood that each intermediate value between an upper and lower limits of a range is also disclosed. An intermediate value within any stated value or range, every lesser range between any other stated value and intermediate values within a stated range, is also included within the disclosure. The upper and lower limits of these smaller ranges may be independently included or excluded in the range.

Unless otherwise stated, all technical and scientific terms used herein have the same meaning as commonly understood by one of ordinary skill in the art to which this invention belongs. Although the disclosure has been described with respect to the some methods and materials, any methods and materials similar or equivalent to those described herein can be used in the embodiments or tests of the disclosure.

The terms “include”, “comprise”, “contain”, “have” and so on used in the disclosure are all open terms, meaning including but not limited to.

Embodiment 1

A preparation method for an Ag and g-$C_3N_4$ co-modified ZnO nanocomposite material includes:

- step 1: dispersing 1.6 g (0.02 mol) of ZnO, 1.6 g of bulk g-$C_3N_4$, and 0.1020 g (0.0006 mol) of $AgNO_3$ in a beaker containing 30 mL of deionized water to obtain a first solution; adding 12 g (0.066 mol) of glucose, 0.1358 g (0.0009 mol) of tartaric acid, 0.3231 g (0.0045 mol) of acrylamide, and 0.1409 g (0.0009 mol) of N,N'-methylene bisacrylamide into the first solution to obtain a second solution; and stirring the second solution magnetically for 2 hours at a temperature of 90° C. in a water bath to obtain a three-dimensional network wet gel; and
- step 2: putting the three-dimensional network wet gel obtained in the step 1 into a drying oven for drying the three-dimensional network wet gel at a temperature of 120° C. to obtain a dry gel, then putting the dry gel in a muffle furnace to calcine the dry gel at a temperature of 550° C. for 3 hours, thereby obtaining the dual-functional Ag and g-$C_3N_4$ co-modified ZnO nanocomposite material (recorded as ZACN).

Comparative Example 1

A preparation method for an Ag modified ZnO-based nanomaterial includes:

step 1: dispersing 1.6 g of ZnO and 0.1020 g of $AgNO_3$ in a beaker containing 30 mL of deionized water to obtain a first solution; adding 12 g of glucose, 0.1358 g of tartaric acid, 0.3231 g of acrylamide, and 0.1409 g of N,N'-methylene bisacrylamide into the first solution to obtain a second solution; and stirring the second solution magnetically for 2 hours at a temperature of 90° C. in a water bath to obtain a three-dimensional network wet gel; and step 2: putting the three-dimensional network wet gel obtained in the step 1 into a drying oven for drying the three-dimensional network wet gel at a temperature of 120° C. to obtain a dry gel, then putting the dry gel in a muffle furnace to calcine the dry gel at a temperature of 550° C. for 3 hours, thereby obtaining the Ag modified ZnO based nanomaterial (recorded as AZ).

Comparative Example 2

A preparation method for a g-$C_3N_4$ modified ZnO based nanomaterial includes:

step 1: dispersing 1.6 g of ZnO and 1.6 g of bulk g-$C_3N_4$ in a beaker containing 30 mL of deionized water to obtain a first solution; adding 12 g of glucose, 0.1358 g of tartaric acid, 0.3231 g of acrylamide, and 0.1409 g of N,N'-methylene bisacrylamide into the first solution to obtain a second solution; and stirring the second solution magnetically for 2 hours at a temperature of 90° C. in a water bath to obtain a three-dimensional network wet gel; and step 2: putting the three-dimensional network wet gel obtained in the step 1 into a drying oven for drying the three-dimensional network wet gel at a temperature of 120° C. to obtain a dry gel, then putting the dry gel in a muffle furnace to calcine the dry gel at a temperature of 550° C. for 3 hours, thereby obtaining the g-$C_3N_4$ modified ZnO-based nanomaterial (recorded as ZCN).

The photocatalytic performance of ZACN prepared in the embodiment 1, AZ prepared in the comparative example 1, ZCN prepared in the comparative example 2, ZnO, and g-$C_3N_4$ are evaluated by following operations.

Figure 1B:
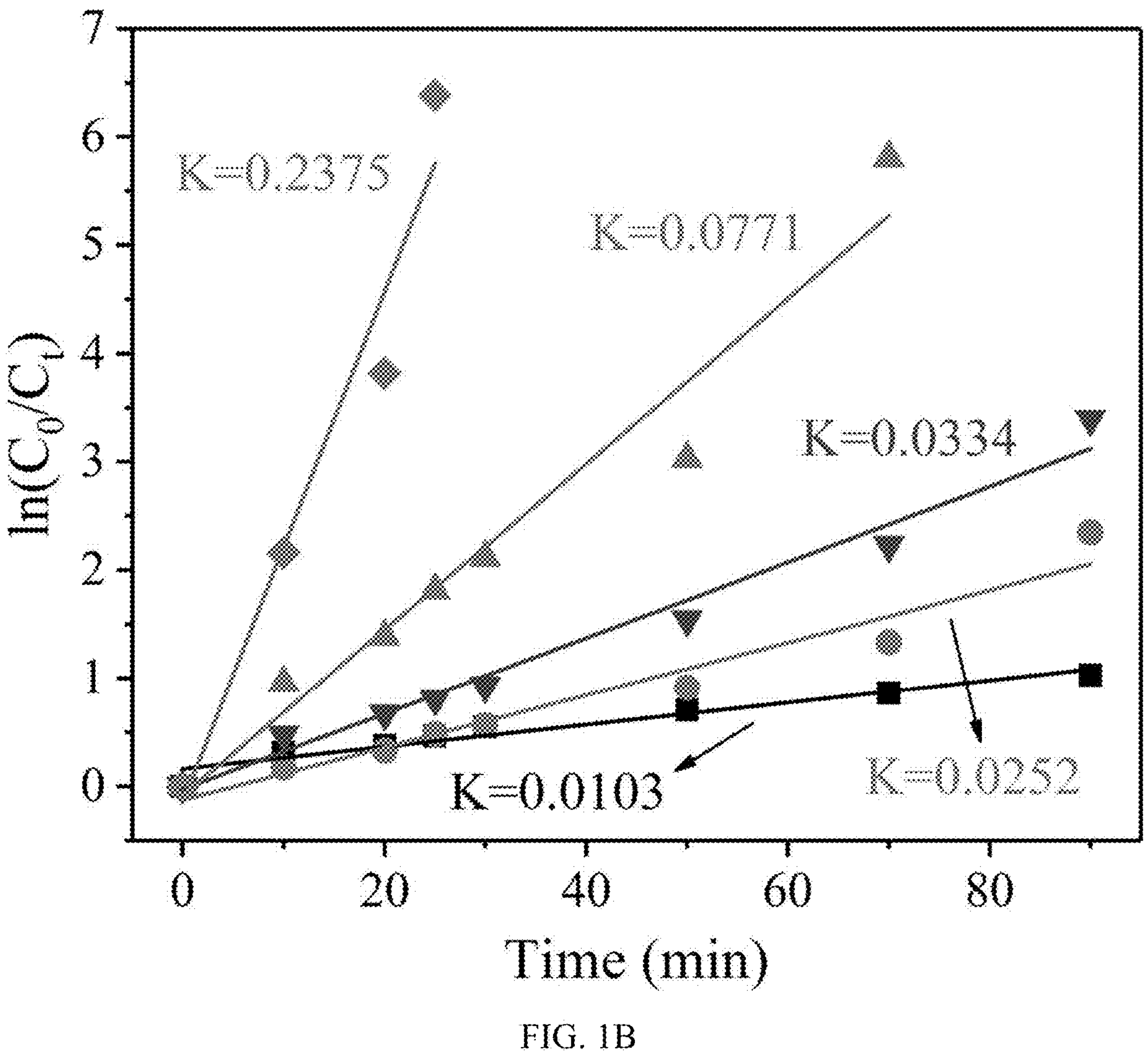
Figure 1C:
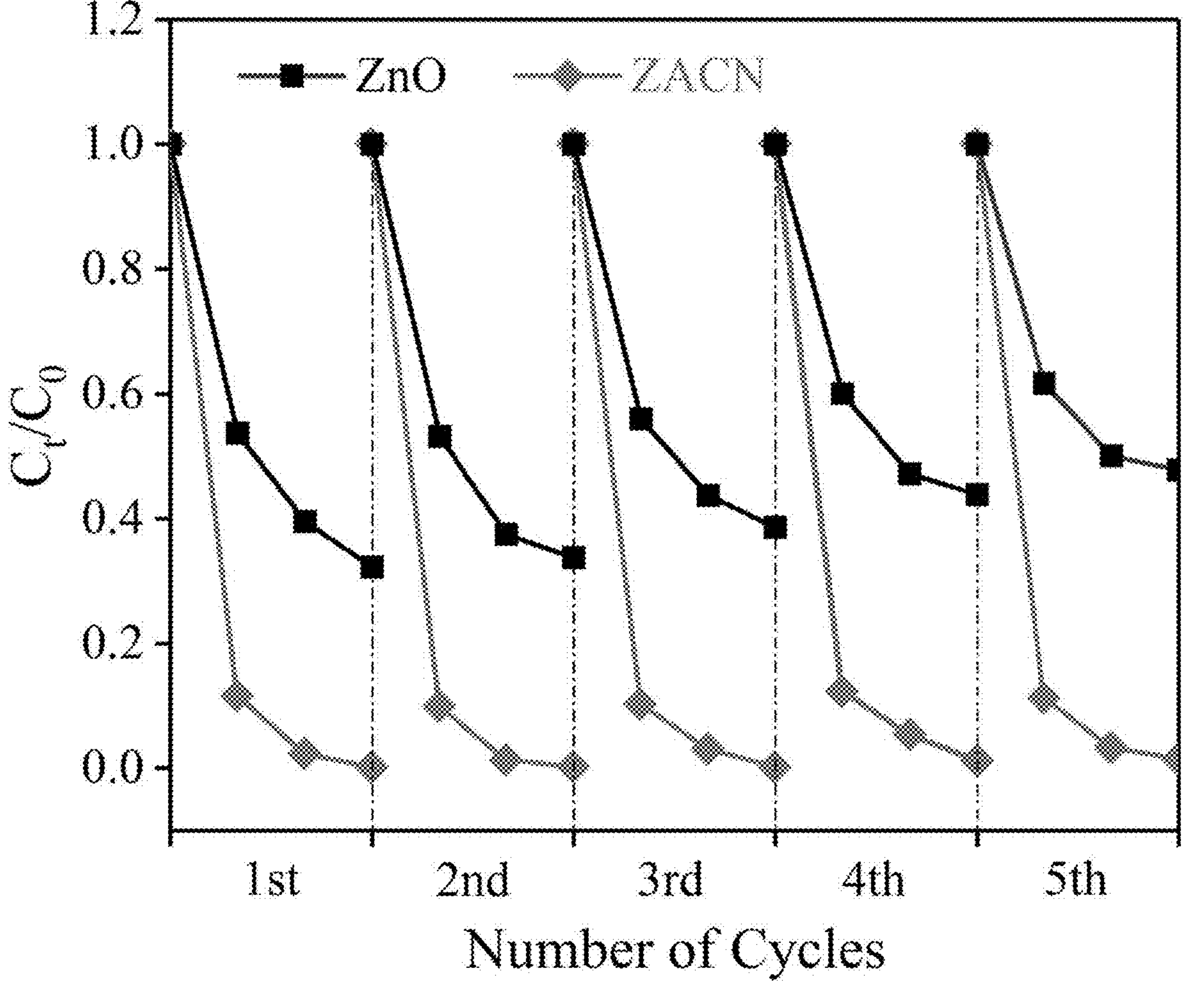
Figure 1D:
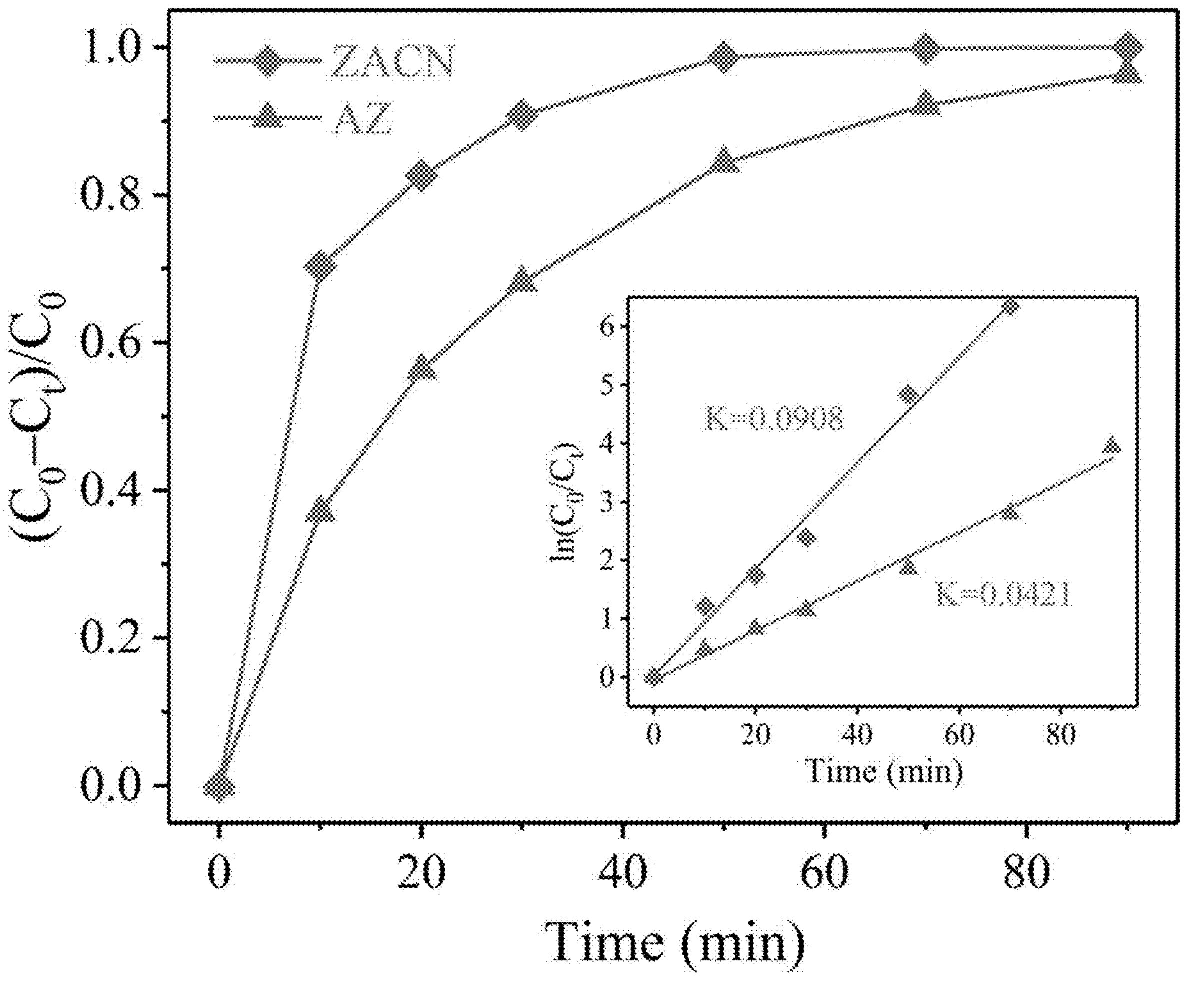

A typical azo dye named Rhodamine B (RhB) is selected as a representative organic pollutant with a concentration of 8 mg/L, photocatalytic activities of the five sample are evaluated under simulated sunlight irradiation and visible light irradiation, and results are illustrated in FIGS. 1A-1D. FIG. 1A illustrates photocatalytic degradation rate curves of the five samples. FIG. 1B illustrates pseudo-first-order kinetic constants of the five samples. FIG. 1C illustrates cyclic degradation rates of Rhodamine B (RhB) dye solutions by ZnO and ZACN under simulated sunlight irradiation (120 $\mu W \cdot cm^{-2}$). FIG. 1D illustrates degradation rates of RhB dye solutions by ZACN and AZ under natural sunlight irradiation (65 $\mu W \cdot cm^{-2}$).

As shown in FIG. 1A and FIG. 1B, about 8.6% of RhB is removed within 90 minutes without adding any catalyst, which is attributed to the photodecomposition of the compound and confirms that the degradation of RhB is mainly driven by a photocatalytic process. The degradation efficiency of pure ZnO and g-$C_3N_4$ is low, 64.2% and 91.5% of the RhB dye solution can be degraded respectively by ZnO and g-$C_3N_4$ within 90 minutes, and the pseudo-first-order kinetic constants (i.e., K values) of ZnO and g-$C_3N_4$ are 0.0103 and 0.0252 respectively. The deposition of Ag greatly enhances the degradation rate of RhB, and 99.3% of RhB is removed by the AZ sample within 40 minutes with a K value being 0.0771. The introduction of g-$C_3N_4$ also significantly enhances the photocatalytic activity, and the degradation efficiency of ZCN is increased by about 31% relative to that of pure ZnO. The ZACN ternary nanocomposite material (i.e., the Ag and g-$C_3N_4$ co-modified ZnO nanocomposite material of the disclosure) exhibits stronger photocatalytic activity compared to the single-component and two-component samples. The ZACN ternary nanocomposite material can remove 97.8% of the dye pollutants within 20 minutes. The K value of the ZACN ternary nanocomposite material is as high as 0.2375, and the K value is about 23.1, and it is 9.4, 7.1 and 3.1 times that of ZnO, g-C3N4, ZCN and AZ, individually.

As shown in FIG. 1C, five cyclic degradation tests are performed on each of ZnO and ZACN under simulated light irradiation to test the stability of ZACN. It can be seen that the degradation efficiency of pure ZnO decreased by about 12% after the five cyclic degradation tests, while ZACN still has a high degradation efficiency for the RhB dye solution after the five cyclic degradation tests. The photocorrosion phenomenon of ZnO is caused by a strong oxidation-reduction ability of electron-hole pairs generated after being excited by light, which will react with unstable $Zn^{2+}$ to generate other substances and reduce the stability of ZnO. Research has shown a heterojunction generated by combining ZnO with g-$C_3N_4$ can promote space charge transport and reduce photocorrosion of ZnO. The above results confirm the effectiveness and stability of ZACN in a photocatalytic process.

FIG. 1D illustrates the photocatalytic degradation of the RhB dye solution (8 mg/L) by AZ and ZACN samples under natural sunlight in Shuangliu District, Chengdu in early July. Compared with an irradiation intensity (120 $\mu W \cdot cm^{-2}$) of simulated light, an irradiation intensity (65 $\mu W \cdot cm^{-2}$) of the natural light is weaker, and thus complete degradation of RhB is delayed for about 40 minutes, but the ZACN sample can still degrade 98.7% of the organic dye within 50 minutes, and the pseudo-first-order kinetic constant of the ZACN sample is 2.2 times that of the AZ sample under the same conditions. This test confirms the practical possibility of the ZACN ternary nanocomposite material prepared by using a polymer network gel method.

The $NO_2$ gas sensing performance of ZACN prepared in the embodiment 1, AZ prepared in the comparative example 1, ZCN prepared in the comparative example 2, and ZnO under light excitation are evaluated.

Figure 2A:
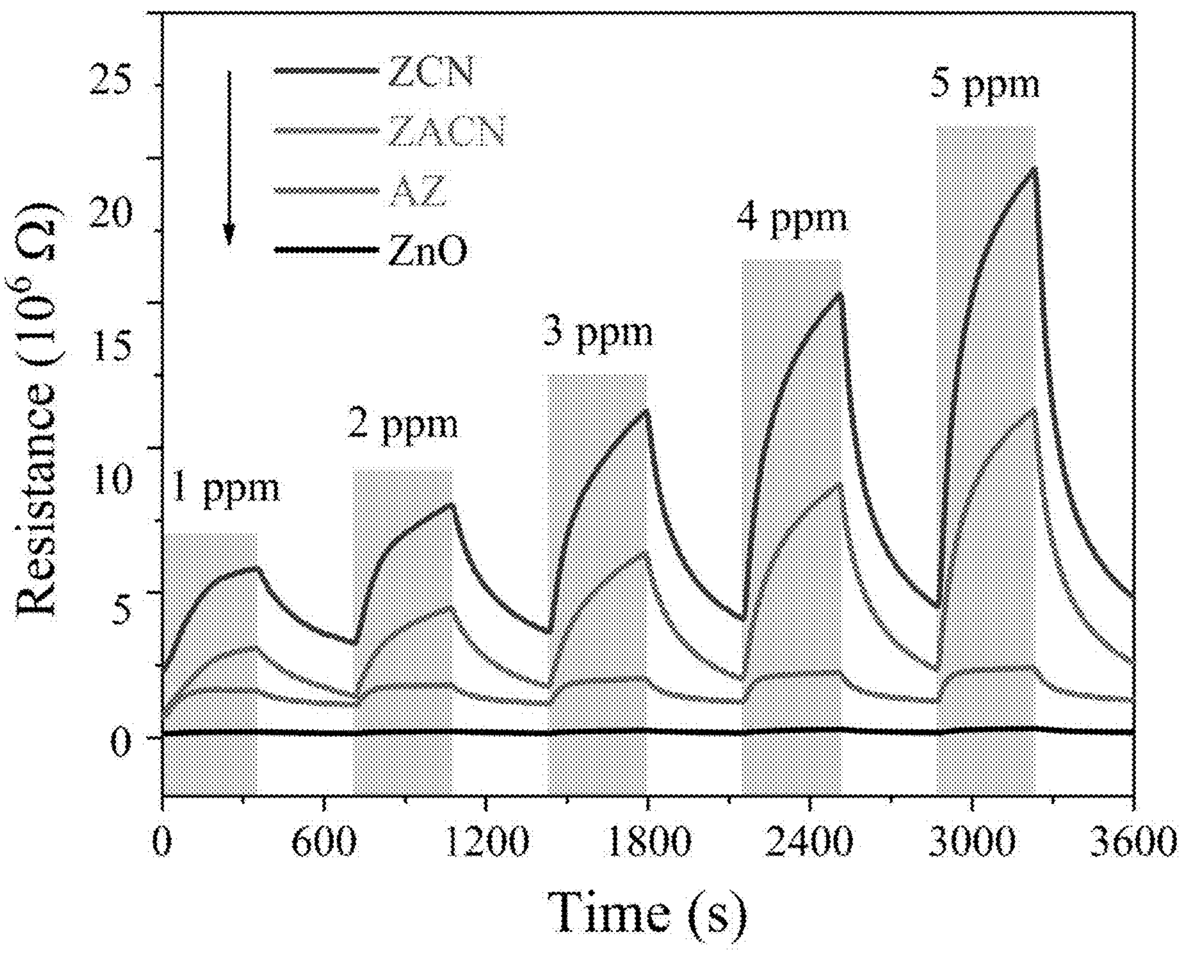
FIGS. 2A-2D illustrate schematic views for evaluation of photo-excited $NO_2$ sensing performance of sensors based on ZACN prepared in the embodiment 1, AZ prepared in the comparative example 1, ZCN prepared in the comparative example 2, and ZnO.
Figure 2B:
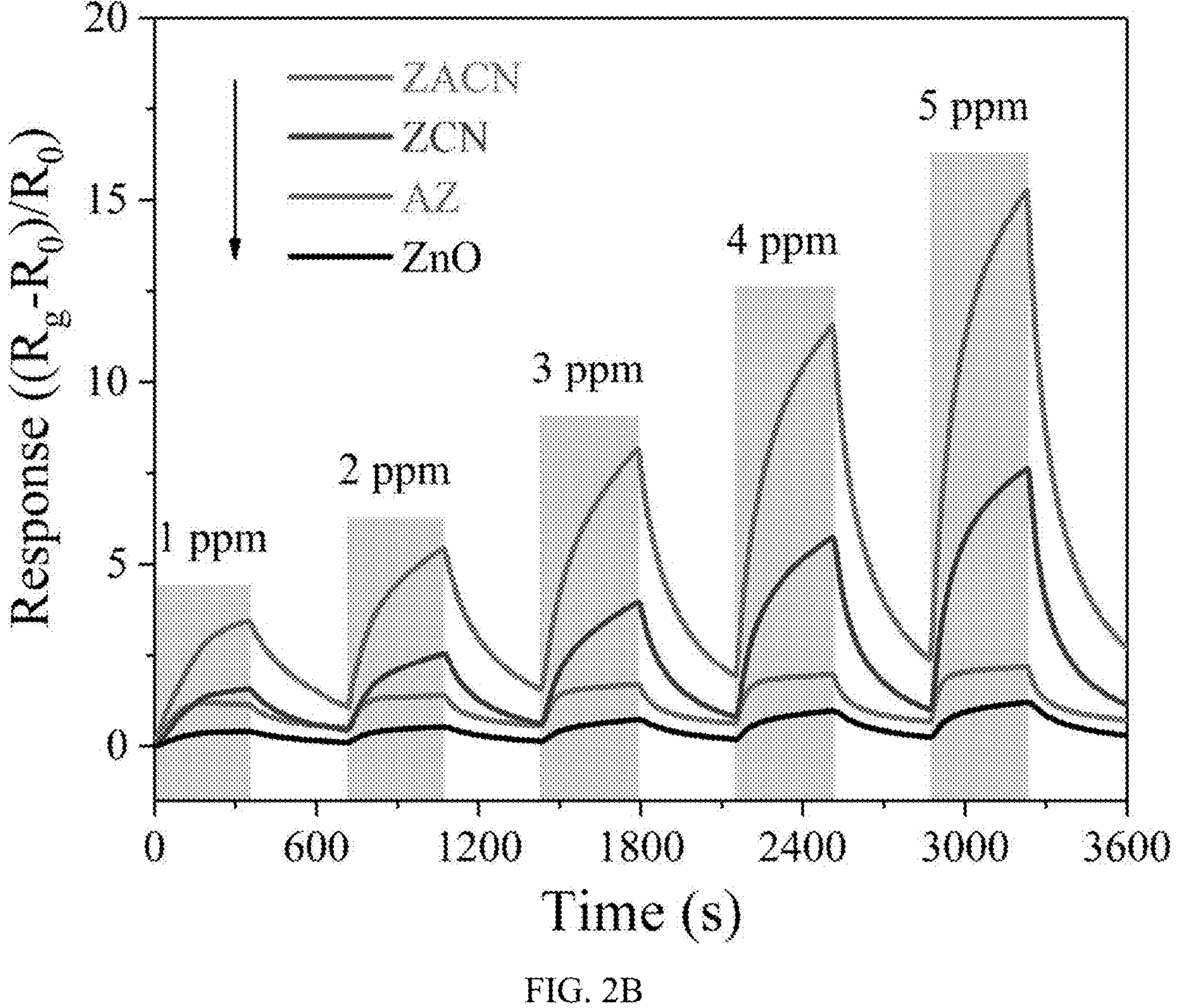
Figure 2C:
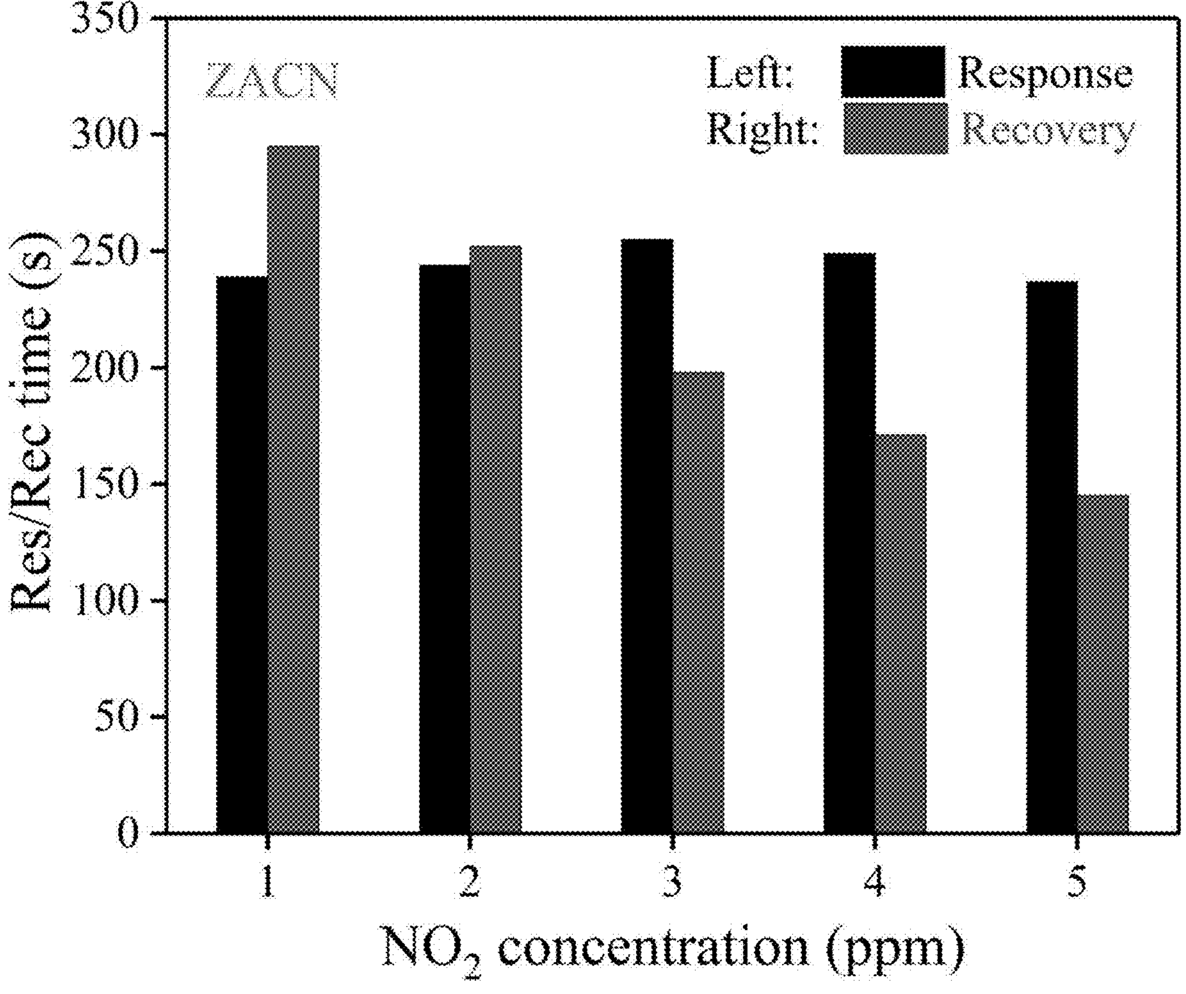
Figure 2D:
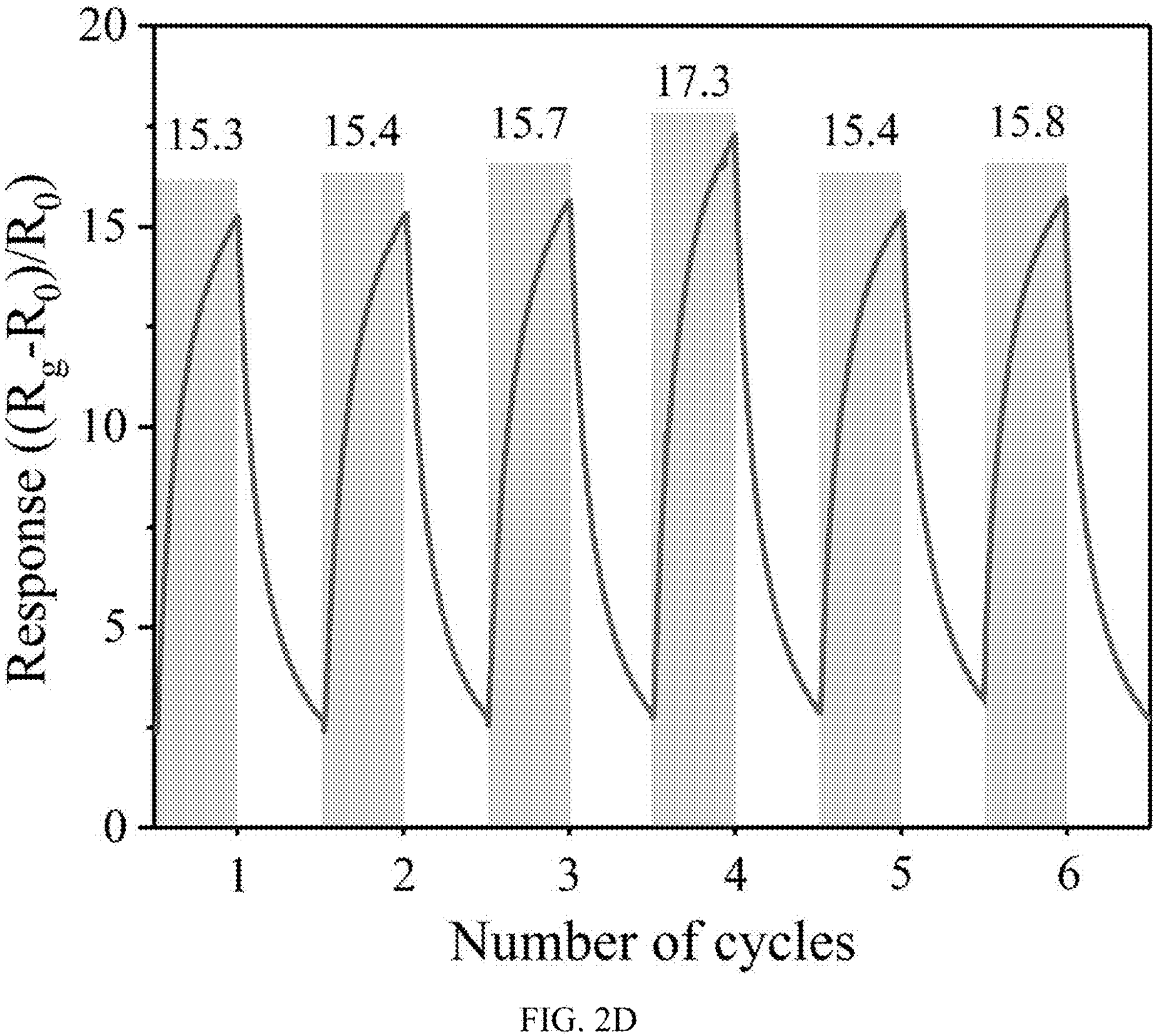

Photoexcited $NO_2$ gas sensors are prepared by a spraying method, specific steps of the spraying method are as follows: using detergent, acetone, ethanol, and deionized water to clean silicon substrates with interdigital electrodes, then drying the silicon substrates; using a spray gun perpendicular to the silicon substrates to spray 5 mL of ethanol suspensions containing different samples (a concentration of each of the samples is 3 mg/mL) onto a corresponding silicon substrate of the silicon substrates, and then drying the silicon substrates at a temperature of 80° C. for 12 hours to obtain the photoexcited $NO_2$ gas sensors. Warm white LED beads with a soft light (the soft light with a color temperature in a range of 4000-4500 Kelvins (K), which is close to sunlight) at room temperature as an excitation light source for tests. Please refer to FIGS. 2A-2D for performance of different sensors. Due to a poor conductivity of the g-$C_3N_4$, a baseline resistance of the g-$C_3N_4$ based sensor is too high and exceeded a measurement range, and thus the sensing performance of the g-$C_3N_4$ sample is not studied. FIG. 2A illustrates a schematic view of dynamic resistance curves of the sensors based on different materials to $NO_2$ gas with a concentration in a range of 1-5 ppm) under warm white light excitation. FIG. 2B illustrates a schematic view of dynamic response curves of the sensors based on different materials to $NO_2$ gas with a concentration in the range of 1-5 ppm under warm white light excitation. FIG. 2C illustrates a schematic diagram of response and recovery time of ZACN to $NO_2$ gas with different concentrations. FIG. 2D illustrates a schematic view of an evaluation result of gas sensing performance of the sensor based on ZACN to $NO_2$ gas with a concentration of 5 ppm under warm white light excitation for 6 months.

From FIG. 2A and FIG. 2B, it can be seen that all sensors exhibit n-type sensing characteristics, that is, after $NO_2$ gas is introduced to containers containing the sensors, all the resistances of the sensors gradually increase and reach a basic saturation state, and then the resistances of the sensors rapidly decrease to near the baseline as $NO_2$ gas is replaced by dry air. In addition, each sensor has a complete response and recovery process, and no poisoning has occurred. Pure ZnO does not have an absorption ability to visible light, and thus its baseline resistance and dynamic resistance change less. The sensor based on the ZACN ternary composite material has an optimal $NO_2$ response sensitivity and a lower detection limit under warm white light excitation. Response values of the sensors under $NO_2$ gas with concentrations of 1-5 ppm are 3.5, 5.5, 8.2, 11.6, and 15.3, respectively. Several sensors exhibit good linear trends within different $NO_2$ concentration ranges.

From FIG. 2C, it can be seen that as the $NO_2$ concentration increases, the ZACN sensor has no significant change in response time, but the recovery time of the ZACN sensor continues to decrease.

From FIG. 2D, it can be seen that the ZACN sensor exhibits significant stability and similar response and recovery times, which confirms the practicality of ZACN-based sensor.

Figure 3A:
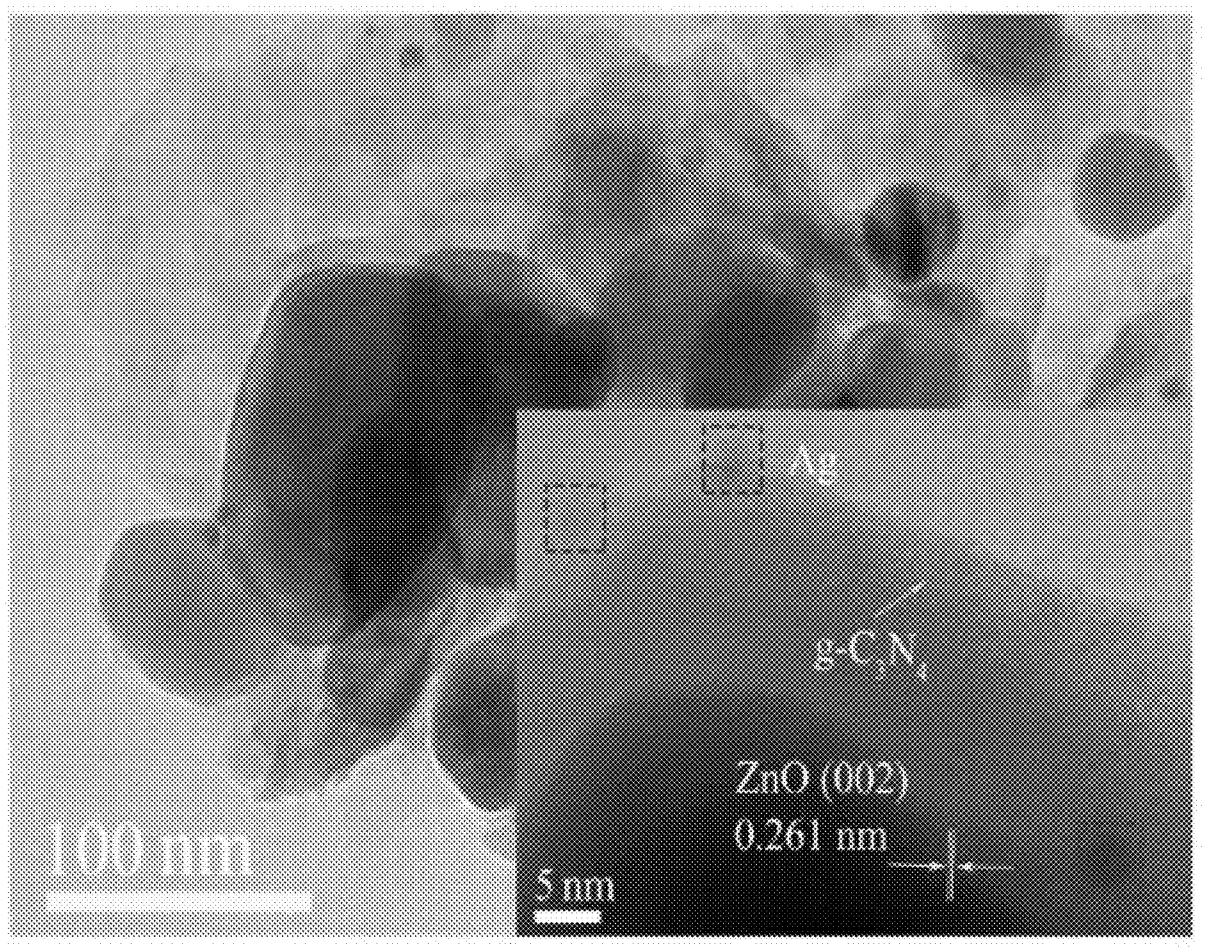
FIGS. 3A-3E illustrate schematic diagrams of comprehensive performance comparisons of ZACN prepared in the embodiment 1, AZ prepared in the comparative example 1, ZCN prepared in the comparative example 2, ZnO, and g-$C_3N_4$.
Figure 3B:
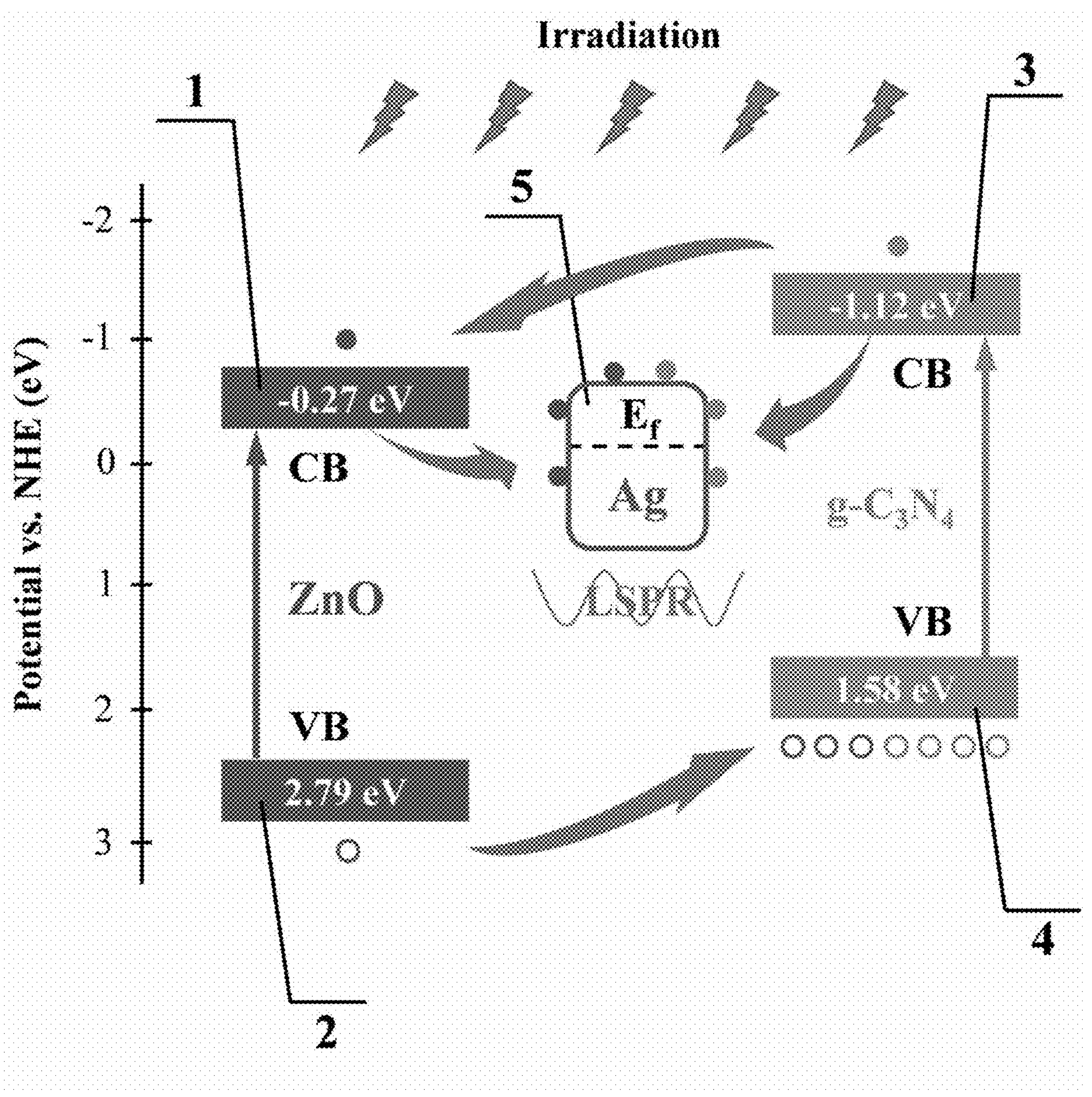
Figure 3C:
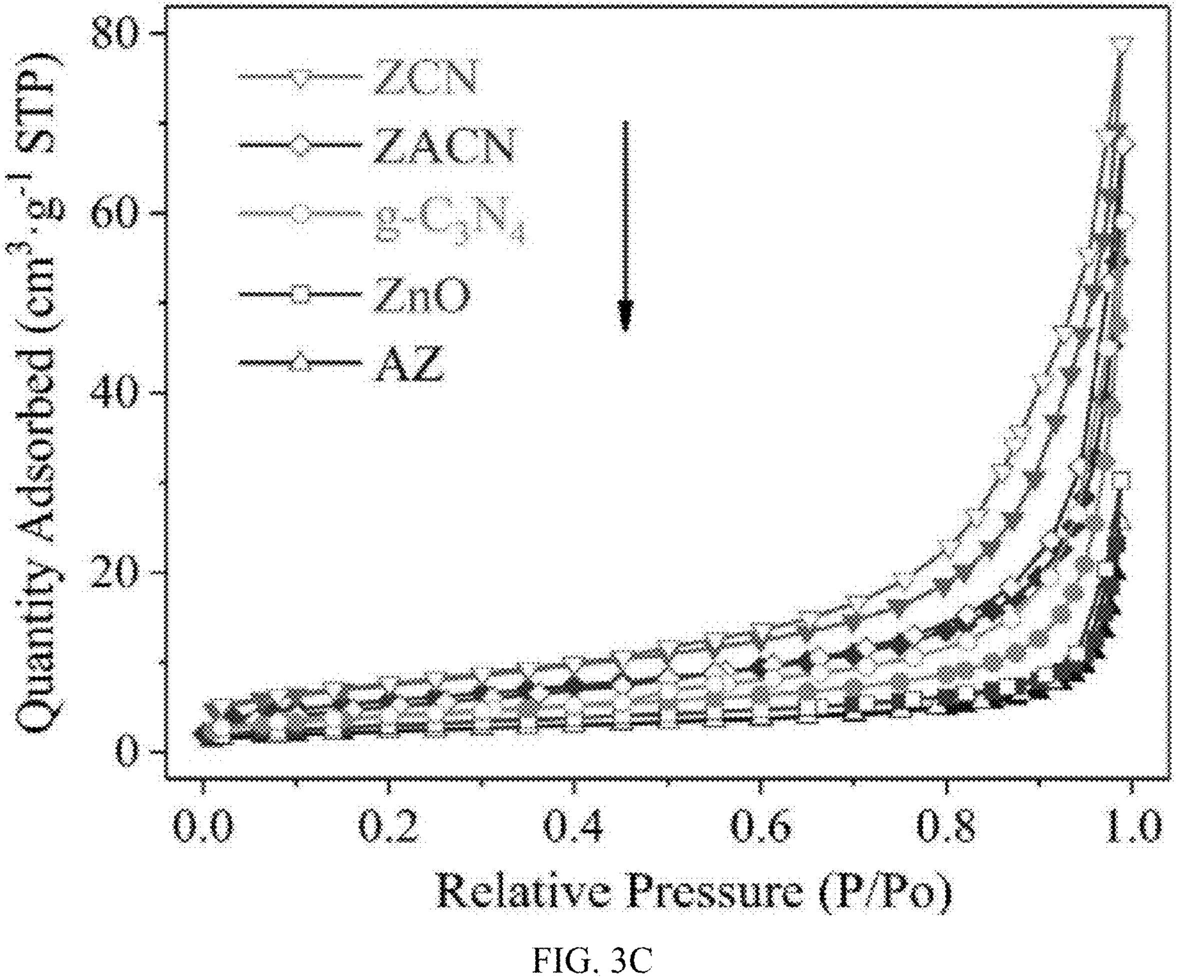
Figure 3D:
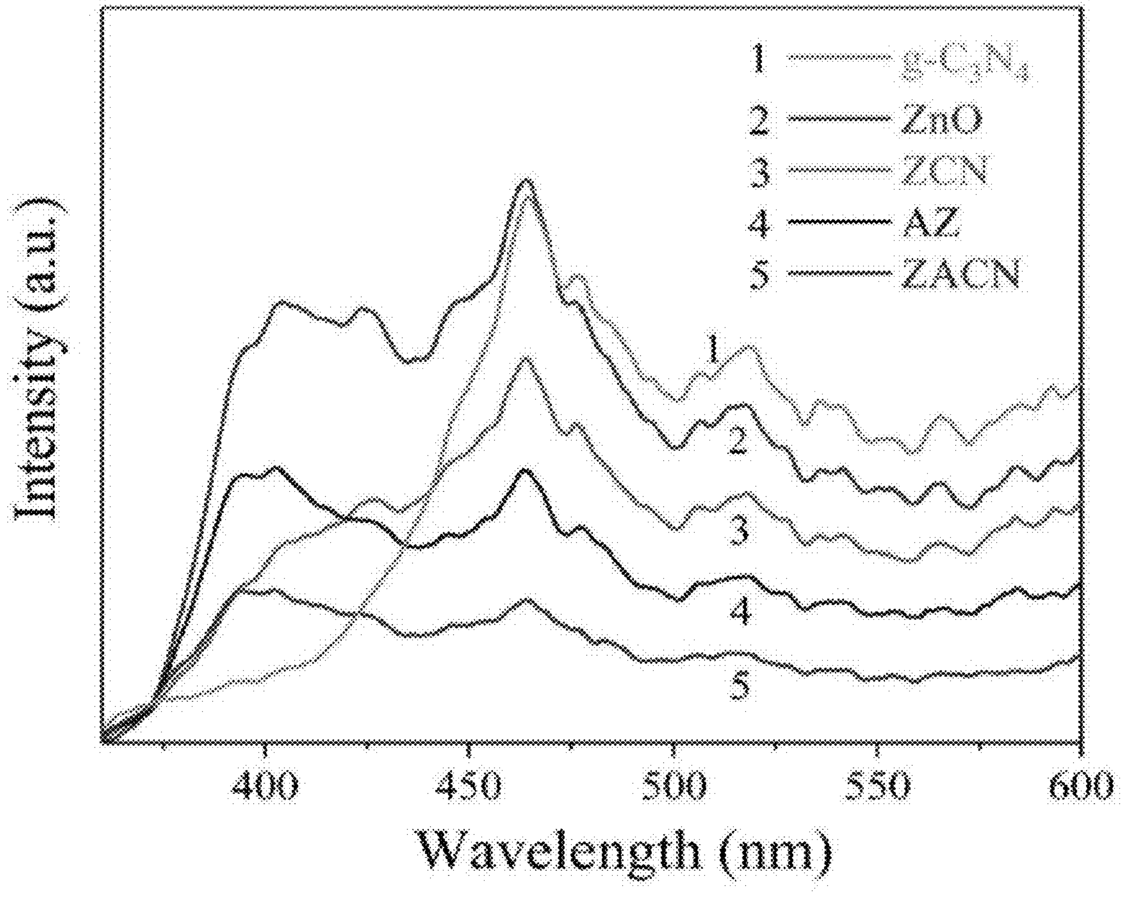
Figure 3E:
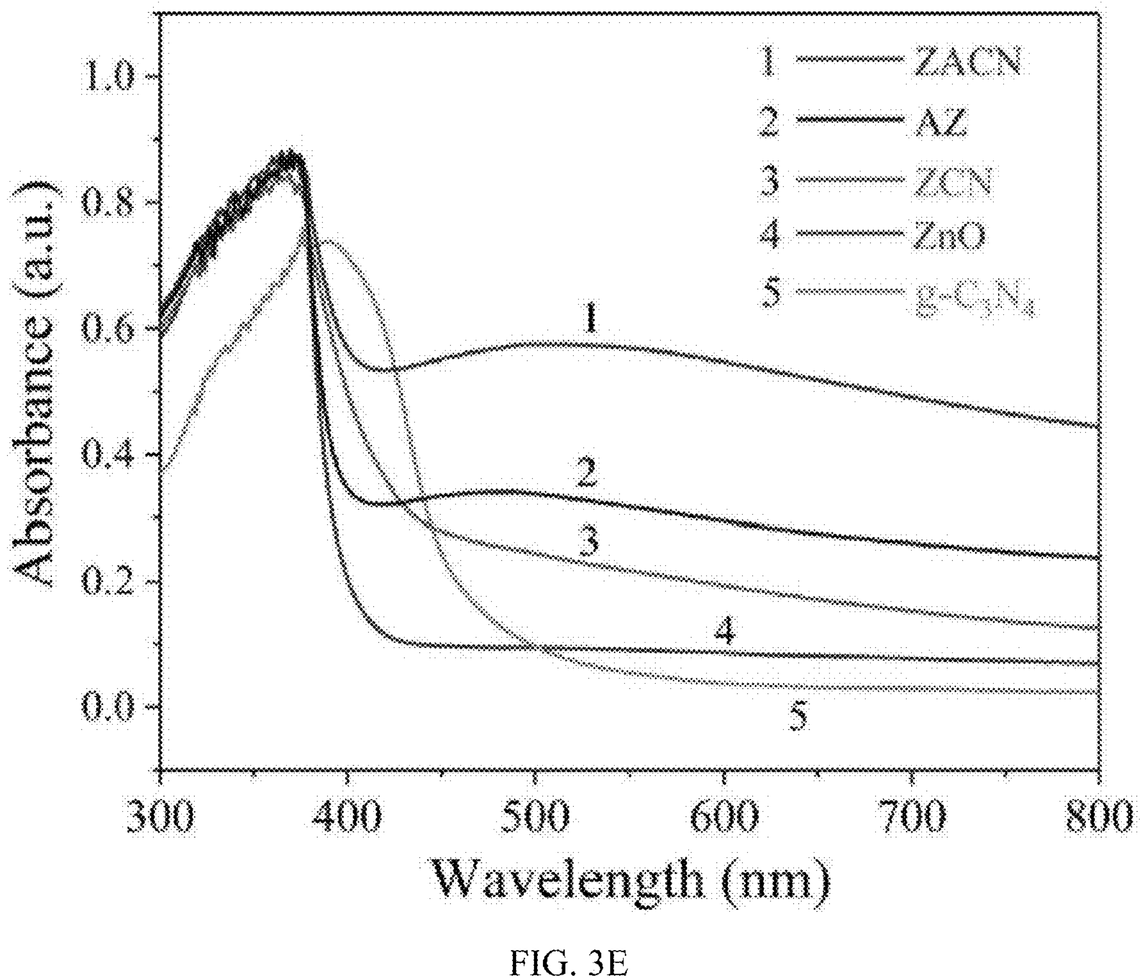

FIGS. 3A-3E illustrate schematic diagrams of comprehensive performance comparisons of ZACN prepared in the embodiment 1, AZ prepared in the comparative example 1, ZCN prepared in the comparative example 2, ZnO, and g-$C_3N_4$. FIG. 3A illustrates a high-resolution TEM image of ZACN. FIG. 3B illustrates a structural schematic diagram of ZACN (1 represents a ZnO conduction band, 2 represents a ZnO valence band, 3 represents a g-$C_3N_4$ conduction band, 4 represents a g-$C_3N_4$ valence band, and 5 represents an Ag nanoparticle). FIG. 3C illustrates a schematic diagram of nitrogen adsorption-desorption isotherms of the five materials. FIG. 3D illustrates a photoluminescence spectrum of the five materials. FIG. 3E illustrates a diffuse reflection absorption spectrum of ultraviolet-visible light of the five materials.

As shown in FIG. 3B, potentials of the conduction band and valence band of ZnO are −0.27 eV and +2.79 eV respectively, and potentials of the conduction band and valence band of g-$C_3N_4$ are −1.12 eV and +1.58 eV respectively. Therefore, potentials of the conduction band of ZnO and the conduction band of g-$C_3N_4$ are both negative with respect to the Fermi level of Ag (−0.24 V vs. NHE). During the preparation of the ZACN ternary nanocomposite material, the g-$C_3N_4$ with a layered structure is transformed into the g-$C_3N_4$ with a nanosheet structure the g-$C_3N_4$ nanosheet has a rough amorphous surface layer, and the nanosheet structure increases the specific surface area of the ZACN ternary nanocomposite material. From a high-resolution TEM image (i.e., FIG. 3A), it is observed that spherical Ag nanoparticles are deposited on the g-$C_3N_4$ nanosheet or ZnO particles, or bridged between the g-$C_3N_4$ nanosheet and ZnO particles, forming various heterostructures of ZnO-g-$C_3N_4$, ZnO—Ag, and g-$C_3N_4$—Ag. A diffuse reflection absorption spectrum (i.e., FIG. 3E) of ultraviolet-visible light indicates the ZACN ternary nanocomposite material have a stronger absorption ability of visible light relative to the two-component materials, and this stronger absorption ability of visible light can be attributed to a synergistic action between a local surface plasmon resonance (LSPR) effect of the Ag nanoparticles and a band matching between ZnO and g-g-$C_3N_4$. Therefore, the ZACN ternary nanocomposite material can absorb more visible light energy under simulated light irradiation to generate more photogenerated electron-hole pairs. In addition, when the ZACN ternary nanocomposite material is excited by light, a surface plasmon resonance (SPR) effect of Ag can enhance local electromagnetic fields to accelerate generation rates of conduction band electrons and valence band holes. Compared with the g-$C_3N_4$, the photogenerated electrons generated in the thin g-$C_3N_4$ nanosheet are more easily migrated to the surface, and these electrons will be transferred in two forms; form 1: the energy level matching of the conduction bands of Ag and g-$C_3N_4$ generates a Schottky barrier, and excited electrons in the conduction band of g-$C_3N_4$ can easily migrate into the Ag particles through the g-$C_3N_4$—Ag heterojunction; and form 2: since the potential of the conduction band of the g-$C_3N_4$ is lower than that of ZnO, this potential difference leads to electrons of the conduction band of the g-$C_3N_4$ capable of being transferred to the conduction band of ZnO through a ZnO-g-$C_3N_4$ heterointerface. Furthermore, the electrons accumulated in the conduction band of ZnO will be further transferred to the Ag nanoparticles deposited on its surface through an energy level difference. Meanwhile, since the potential of the valence band of ZnO is higher than that of g-$C_3N_4$, valence band holes are transferred from the valence band of ZnO to the valence band of g-$C_3N_4$. As shown in a photoluminescence spectrum (i.e., FIG. 3D), the formation of various heterojunctions greatly enhances a migration path of photogenerated electron-hole pairs, thereby achieving a purpose of suppressing recombination of photogenerated carriers. The large specific surface area, strong absorption ability of visible light, and high separation efficiency of photogenerated carriers of the ZACN ternary nanocomposite material are beneficial to improve photocatalytic and gas sensing properties.

Figure 4:
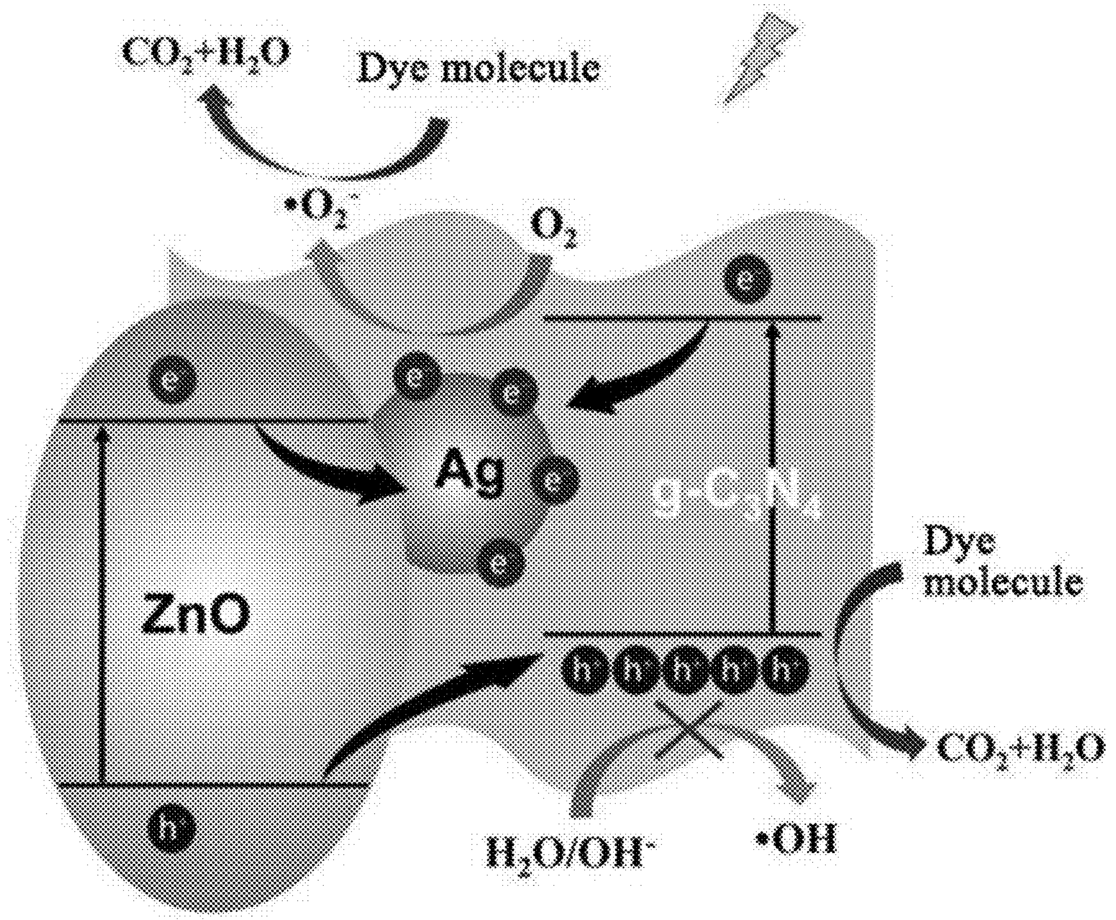
FIG. 4 illustrates a mechanism diagram of photocatalytic degradation of organic dye pollutants by ZACN prepared in the embodiment 1 of the disclosure.

FIG. 4 illustrates a mechanism diagram of photocatalytic degradation of organic dye pollutants by ZACN prepared in the embodiment 1 of the disclosure.

FIG. 4 shows a possible mechanism of a photocatalytic process of ZACN ternary nanocomposite material under simulated light irradiation. The ZACN ternary nanocomposite material has a large specific surface area, and the large specific surface area provides a larger contact area between dye molecules and oxygen molecules. The improved absorption ability of visible light and separation efficiency of photoexcited carriers enable $e^-$ (electron) and $h^+$ (hole) to participate in a whole photocatalytic reaction. In the photocatalytic reaction, electrons accumulated in Ag particles deposited on ZnO and g-$C_3N_4$ react with surrounding oxygen molecules to form highly active $\cdot O_2^-$ (superoxide radical), as shown in equation (1):

$$O_2+e^- \rightarrow O_2^- \quad (1).$$

Due to a low valence band potential of g-$C_3N_4$, $h^+$ aggregated on the g-$C_3N_4$ cannot react with $OH^-$ or $H_2O$ to generate hydroxyl radicals ($\cdot$OH). However, $h^+$ itself has strong oxidability and can directly participate in the photodegradation of dye molecules. These highly active substances can repeatedly degrade organic dye pollutants in the reaction system, ultimately decomposing the organic dye pollutants into substances such as carbon dioxide and water, as shown in equation (2):

$$\cdot O_2^- + h^+ + \text{polluts} \rightarrow H_2O + CO_2 \quad (2).$$

Figure 5:
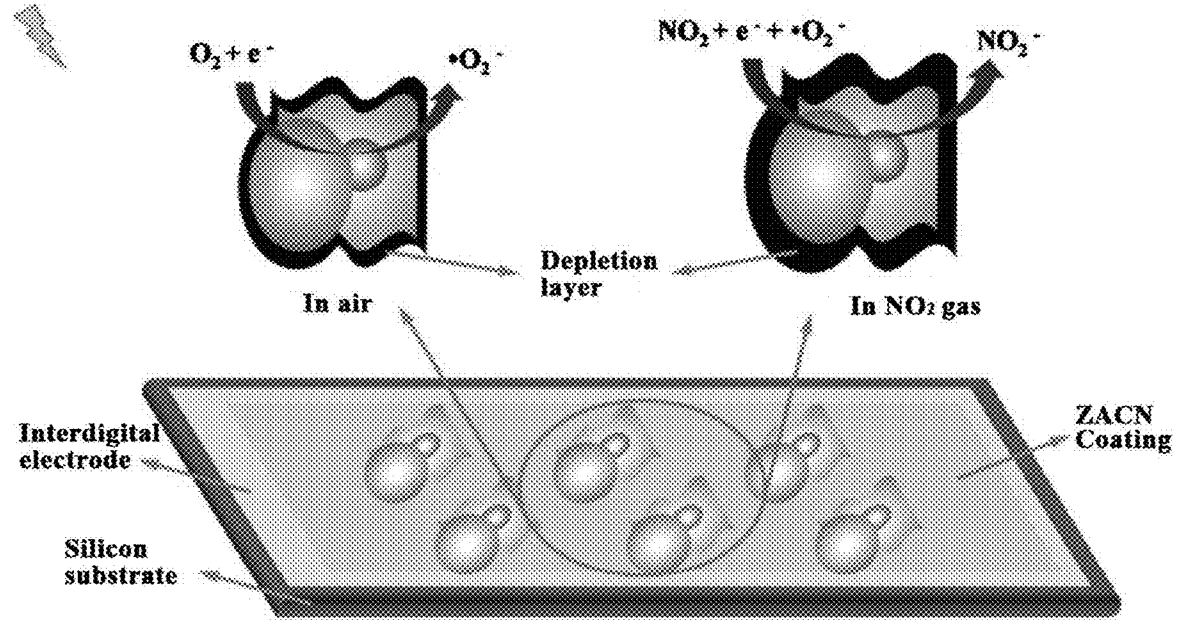
FIG. 5 illustrates a $NO_2$ gas sensing detection mechanism diagram of a photoexcited $NO_2$ gas sensor prepared by a spraying method using ZACN prepared in the embodiment 1.

FIG. 5 illustrates a $NO_2$ gas sensing detection mechanism diagram of a photoexcited $NO_2$ gas sensor prepared by a spraying method using ZACN prepared in the embodiment 1 under warm white light excitation.

FIG. 5 shows a $NO_2$ gas sensing detection mechanism of ZACN ternary nanocomposite based sensor under warm white light excitation. Firstly, under light excitation, photogenerated electron-hole pairs will be generated in a coating material of the sensor, as shown in equation (3):

$$\text{ZACN}++h\nu \rightarrow e^- + h^+ \quad (3)$$

For a n-type gas sensor, when the n-type gas sensor is exposed to air, oxygen will be adsorbed onto a material surface of the sensor and free electrons $e^-$ will be extracted from an active material through a reaction shown in equation (4), and oxygen is transformed into superoxide radicals:

$$O_2+e^- \rightarrow \cdot O_2^- \quad (4).$$

As a concentration of electrons is reduced, a surface depletion layer is formed and increases the resistance. $NO_2$ gas is an oxidizing gas with high electron affinity, when the sensor is exposed to $NO_2$ gas, $NO_2$ molecules will capture electrons from $\cdot O_2^-$ and the remained photogenerated electrons of Ag nanoparticles to generate nitrate ions ($NO_2$), as shown in equations (5)-(6):

$$NO_2+e^- \rightarrow NO_2^- \quad (5);$$

$$NO_2+\cdot O_2^- \rightarrow NO_2^- + O_2 \quad (6).$$

The trapping of electrons leads to the widening of the surface depletion layer, and thus the resistance further increases. When the introduction of $NO_2$ gas is stopped, the photogenerated electrons captured by $NO_2^-$ and $\cdot O_2^-$ adsorbed on the surface of the material will recombine with the holes, so that the depletion layer will return to its initial state, as shown in equation (7):

$$NO_2^- + O_2^- + h^+ \rightarrow NO_2 + O_2 + h\nu \quad (7).$$

The above embodiments are only exemplary embodiments of the disclosure and do not limit a scope of the disclosure. On a premise of not deviating from design spirits of the disclosure, various modifications and improvements made by ordinary of those skill in the art to the technical schemes of the disclosure should fall within the scope of protection defined in the claims of the disclosure.

What is claimed is:

1. A preparation method for a silver (Ag) and graphitic carbon nitride (g-$C_3N_4$) co-modified zinc oxide (ZnO) nanocomposite material using a polymer network gel method, comprising:

dispersing zinc oxide, bulk graphitic carbon nitride, and a soluble silver salt in water to obtain a first solution; adding glucose, a complexing agent, a polymer monomer, and a cross-linking agent into the first solution to obtain a second solution; performing a heating reaction on the second solution to obtain a three-dimensional network wet gel; drying the three-dimensional network wet gel to obtain a dry gel, and calcining the dry gel to obtain the Ag and g-$C_3N_4$ co-modified ZnO nanocomposite material.

2. The preparation method for the Ag and g-$C_3N_4$ co-modified ZnO nanocomposite material using the polymer network gel method as claimed in claim 1, wherein a mass ratio between the zinc oxide and the bulk graphitic carbon nitride is 1:1, and a molar ratio between silver ions in the soluble silver salt and the zinc oxide is 3:100.

3. The preparation method for the Ag and g-$C_3N_4$ co-modified ZnO nanocomposite material using the polymer network gel method as claimed in claim 1, wherein the complexing agent is tartaric acid, the polymer monomer is acrylamide, and the cross-linking agent is N,N'-methylene bisacrylamide.

4. The preparation method for the Ag and g-$C_3N_4$ co-modified ZnO nanocomposite material using the polymer network gel method as claimed in claim 1, wherein a molar ratio between the glucose and silver ions in the soluble silver salt is 110:1, a molar ratio between the complexing agent and the silver ions in the soluble silver salt is 1.5:1, a molar ratio between the polymer monomer and the silver ions in the soluble silver salt is 7.5:1, and a molar ratio between the cross-linking agent and the silver ions in the soluble silver salt is 1.5:1.

5. The preparation method for the Ag and g-$C_3N_4$ co-modified ZnO nanocomposite material using the polymer network gel method as claimed in claim 1, wherein a temperature of the heating reaction is 90 Celsius degrees (° C.), and a duration of the heating reaction is 2 hours (h).

6. The preparation method for the Ag and g-$C_3N_4$ co-modified ZnO nanocomposite material using the polymer network gel method as claimed in claim 1, wherein a temperature of calcining the dry gel is 550° C., and a duration of calcining the dry gel is 3 h.

* * * * *